US012655365B2

(12) United States Patent
Anderson et al.

(10) Patent No.: US 12,655,365 B2
(45) Date of Patent: Jun. 16, 2026

(54) LOW FOAM CLEANING COMPOSITIONS

(71) Applicant: ECOLAB USA INC., Saint Paul, MN (US)

(72) Inventors: Derrick Anderson, Saint Paul, MN (US); Victor Fuk-Pong Man, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 660 days.

(21) Appl. No.: 17/302,278

(22) Filed: Apr. 29, 2021

(65) Prior Publication Data

US 2021/0340464 A1 Nov. 4, 2021

Related U.S. Application Data

(60) Provisional application No. 62/704,256, filed on Apr. 30, 2020.

(51) Int. Cl.

| | |
|---|---|
| ***C11D 1/62*** | (2006.01) |
| ***B08B 3/04*** | (2006.01) |
| ***C11D 3/00*** | (2006.01) |
| ***C11D 3/20*** | (2006.01) |
| ***C11D 3/30*** | (2006.01) |
| ***C11D 3/33*** | (2006.01) |

(52) U.S. Cl.

CPC .............. *C11D 1/62* (2013.01); *C11D 3/0094* (2013.01); *C11D 3/2082* (2013.01); *C11D 3/2086* (2013.01); *C11D 3/30* (2013.01); *C11D 3/33* (2013.01)

(58) Field of Classification Search

CPC ....... C11D 1/62; C11D 3/2082; C11D 3/2086; C11D 3/33; B08B 3/04

See application file for complete search history.

(56) References Cited

U.S. PATENT DOCUMENTS

| | | | |
|---|---|---|---|
| 4,320,147 | A | 3/1982 | Schaeufele |
| 5,389,685 | A | 2/1995 | Smith et al. |
| 5,545,749 | A | 8/1996 | Smith et al. |

(Continued)

FOREIGN PATENT DOCUMENTS

| | | | |
|---|---|---|---|
| JP | 2009091469 | A | 4/2009 |
| JP | 2018188550 | A | 11/2018 |

(Continued)

OTHER PUBLICATIONS

International Searching Authority in connection with PCT/US2021/029811 filed Apr. 29, 2021, “The International Search Report and the Written Opinion of the International Searching Authority, or the Declaration”, 12 pages, mailed Jul. 27, 2021.

*Primary Examiner* — Brian P Mruk

(74) *Attorney, Agent, or Firm* — McKee, Voorhees & Sease, PLC

(57) ABSTRACT

The disclosure relates to low foam cleaning compositions comprising quaternary ammonium compounds, as well as, methods of manufacturing and methods of using the low foam cleaning compositions. Beneficially the cleaning compositions are compatible with cleaning methods and apparatuses requiring low foam, including, but not limited to, machine warewash and clean-in-place. The cleaning compositions are particularly suitable for low temperature sanitizing applications.

15 Claims, 2 Drawing Sheets

(56) References Cited

U.S. PATENT DOCUMENTS

| | | | |
|---|---|---|---|
| 5,547,990 | A | 8/1996 | Hall et al. |
| 5,798,329 | A | 8/1998 | Taylor et al. |
| 5,833,741 | A | 11/1998 | Walker |
| 6,464,764 | B1 | 10/2002 | Lichtenberg et al. |
| 6,583,181 | B1 | 6/2003 | Chiang et al. |
| 6,939,840 | B2 | 9/2005 | Lichtenberg et al. |
| 8,221,733 | B2 | 7/2012 | Lichtenberg et al. |
| 10,206,392 | B2 | 2/2019 | Kloeppel et al. |
| 10,285,400 | B2 | 5/2019 | Lei et al. |
| 10,433,545 | B2 | 10/2019 | Karandikar et al. |
| 2003/0029812 | A1 | 2/2003 | Burns et al. |
| 2003/0114342 | A1 | 6/2003 | Hall |
| 2003/0187073 | A1 | 10/2003 | Lichtenberg et al. |
| 2004/0220275 | A1 | 11/2004 | Utzeler et al. |
| 2005/0124723 | A1 | 6/2005 | Fritschi et al. |
| 2010/0160201 | A1 | 6/2010 | Scheuing et al. |
| 2014/0171512 | A1 | 6/2014 | Kloeppel et al. |
| 2016/0295859 | A1* | 10/2016 | Chan .................... A61K 8/0208 |
| 2017/0015945 | A1 | 1/2017 | Larson |
| 2017/0284605 | A1 | 10/2017 | Janak et al. |
| 2018/0007895 | A1* | 1/2018 | Karandikar ............... A61L 2/18 |
| 2018/0042228 | A1 | 2/2018 | Man et al. |
| 2018/0320110 | A1 | 11/2018 | Dotzauer et al. |
| 2020/0229435 | A1 | 7/2020 | Malet et al. |
| 2020/0305437 | A1 | 10/2020 | McGeechan et al. |

FOREIGN PATENT DOCUMENTS

| | | | | |
|---|---|---|---|---|
| WO | 0035283 | A1 | 6/2000 | |
| WO | 0059696 | A2 | 10/2000 | |
| WO | 2008049616 | A1 | 5/2008 | |
| WO | 2017083798 | A1 | 5/2017 | |
| WO | 2018013523 | A1 | 1/2018 | |
| WO | 2018031067 | A1 | 2/2018 | |
| WO | WO 2021/219351 | * | 11/2021 | ............. C11D 1/645 |

* cited by examiner

LOW FOAM CLEANING COMPOSITIONS

CROSS-REFERENCE

This application claims priority under 35 U.S.C. § 119 to provisional application U.S. Ser. No. 62/704,256 filed on Apr. 30, 2020 entitled "LOW FOAM CLEANING COMPOSITIONS", which is herein incorporated by reference in its entirety, including without limitation, the description, claims, figures, and examples.

TECHNICAL FIELD

The invention relates to cleaning compositions with reduced foaming. In particular, cleaning compositions comprising quaternary ammonium compounds, wherein the compositions have reduced foaming.

BACKGROUND

Quaternary ammonium compounds are recognized for their sanitizing properties. However, they have traditionally not been incorporated into areas requiring low foam properties, including, but not limited to, machine warewash and clean-in-place. This is because quaternary ammonium compounds are known to have high foam properties, particularly under agitation or shear forces. High foaming compositions are known to interfere with the operation of warewash machines and clean-in-place. For example, accumulation of foam can cause cavitation of pumps and hinder the proper mechanical function of spray arms. Additionally, foam can dry on the article being cleaned (such as ware) and leave a residue. In applications where low foaming compositions is preferred or required, compositions have relied on other active compounds for cidal activity. For example, in such contexts, there has often been a reliance on chlorine and/or peroxide based sanitizers. Accordingly, there is a need for quaternary ammonium based sanitizing compositions that are suitable for low foaming applications.

Therefore, an object of the invention is to provide low foam cleaning compositions incorporating quaternary ammonium compounds.

A further object of the invention is compositions suitable for use in machine warewash and clean-in-place.

Still a further object of the invention is to provide compositions suitable for low temperature sanitizing compositions.

Other objects, advantages and features of the present invention will become apparent from the following specification taken in conjunction with the accompanying drawings.

BRIEF SUMMARY

An advantage of the cleaning compositions described herein is that they have low foam properties while incorporating quaternary ammonium compounds. It is an advantage of the compositions that they suitable for use in machine warewash and clean-in-place. Yet another advantage of the compositions is that they provide effective sanitizing in low temperature conditions. Still a further advantage of the compositions, is that they have low odor properties.

As disclosed herein, a preferred embodiment is a cleaning composition comprising a quaternary ammonium compound, and a polycarboxylic acid and/or salt thereof; wherein the polycarboxylic acid has at least two pKa values, and wherein each of the pKa values is less than about 7.

Also disclosed herein, is a preferred method of cleaning an article comprising contacting the article with a cleaning composition comprising a quaternary ammonium compound, and a polycarboxylic acid and/or salt thereof; wherein the polycarboxylic acid has at least two pKa values, and wherein each of the pKa values is less than about 7.

In a preferred embodiment, the polycarboxylic acid comprises one or more of citric acid, succinic, malic acid, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), N,N-Dicarboxymethyl glutamic acid tetrasodium salt (GLDA), methylglycin diacetic acid (MGDA), a salt of any of the foregoing, or sodium xylene sulfonate. In a preferred embodiment, the quaternary ammonium compound is alkyl (C8-C16) dimethyl benzyl ammonium chloride (ADBAC), alkyl (C8-16) dimethyl ethyl benzyl ammonium chloride (ADEBAC), dialkyl (C8-C16) dimethyl ammonium chloride (DAAC), or a mixture thereof. As disclosed herein, the composition can be a solid or a liquid and can further comprise one or more of a dye, an odorant, a pH modifier, a sheeting agent, and a surfactant. Also disclosed herein, is a preferred method of manufacturing a cleaning composition.

While multiple embodiments of the inventions are disclosed, still other embodiments will become apparent to those skilled in the art from the following detailed description, which shows and describes illustrative embodiments of the invention. Accordingly, the examples, figures, and detailed description are to be regarded as illustrative in nature and not restrictive.

Figure 1A:
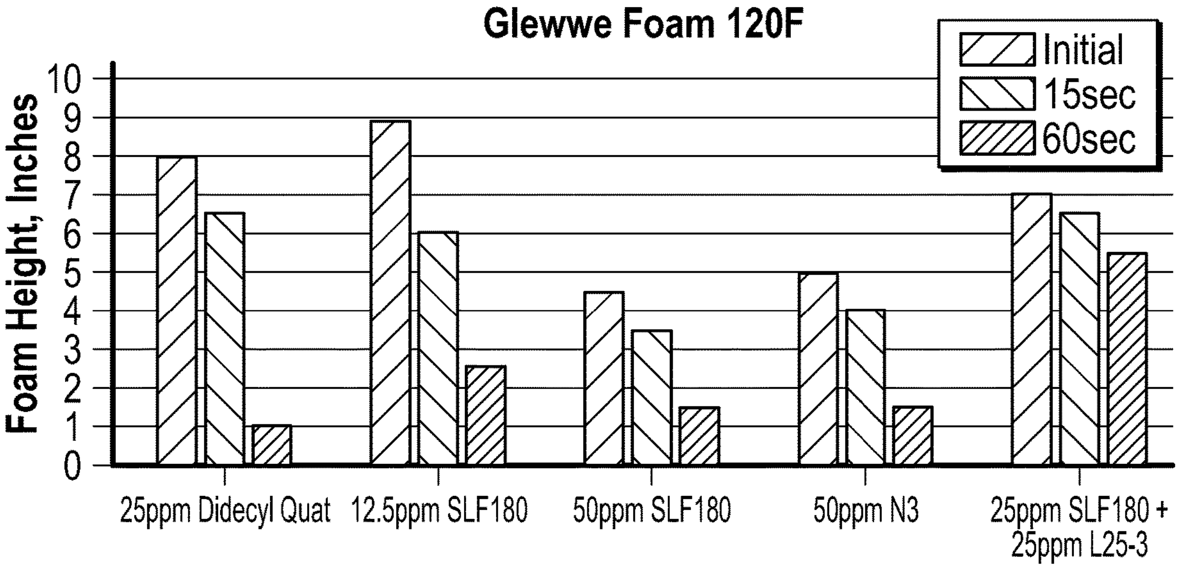
FIGS. 1A and 1B show bar graphs comparing the foam properties of various quaternary ammonium compounds on their own and in the presence of traditional defoaming surfactants immediately upon mixing in solution, about 15 seconds after mixing, and about 1 minute after mixing. The foam height measurements are shown in inches.

Various embodiments of the present invention will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present disclosure relates to low foam cleaning compositions comprising quaternary ammonium compounds. The cleaning compositions have many advantages over existing low foam cleaning compositions. For example, the low foam cleaning compositions incorporate a quaternary ammonium compound while retaining low foam properties. Because of this, the compositions are suitable for applications requiring low foam such as machine warewash and clean-in-place. Additionally, the compositions provide effective cidal activity under low temperature conditions. In a preferred embodiment, the cleaning compositions can be used as sanitizing compositions.

The embodiments of this invention are not limited to particular cleaning conditions, soils, or cleaning apparatuses, which can vary and are understood by skilled artisans. It is further to be understood that all terminology used herein is for the purpose of describing particular embodiments only, and is not intended to be limiting in any manner or scope.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, temperature, pH, and log count of bacteria or viruses. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, coms, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillow cases, towels, table linen, table cloth, bar mops and uniforms. The invention additionally provides a composition and method for treating non-laundry articles and surfaces including hard surfaces such as dishes, glasses, and other ware.

As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the phrases "objectionable odor," "offensive odor," or "malodor," refer to a sharp, pungent, or acrid odor or atmospheric environment from which a typical person withdraws if they are able to. Hedonic tone provides a measure of the degree to which an odor is pleasant or unpleasant. An "objectionable odor," "offensive odor," or "malodor" has an hedonic tone rating it as unpleasant as or more unpleasant than a solution of 5 wt-% acetic acid, propionic acid, butyric acid, or mixtures thereof.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 3 log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

As used herein, the term "soil" or "stain" refers to a non-polar oily substance which may or may not contain particulate matter such as mineral clays, sand, natural mineral matter, carbon black, graphite, kaolin, environmental dust, etc.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Low Foam Cleaning Compositions

The low foam cleaning compositions according to the present application can be liquid or solid. Solid compositions are concentrated and require dissolving with a sufficient amount of carrier to achieve a desired concentration of active ingredients. Liquid compositions can be concentrated (requiring further dissolving before use) or ready to use solutions. The desired concentration for a ready-to-use solution may be dependent on its end-use and application. Further, it should be understood that the concentrates may vary in their concentration based on the end dilution ratio and whether the concentrate is formulated as an anhydrous or aqueous formulation.

The pH of the liquid compositions, or solid compositions upon dilution, may range from about 4.5 to about 10, preferably between about 4.5 and about 9, more preferably between about 5 and about 8.5. In a concentrated composition, the pH is preferably between about 5 and about 10, more preferably between about 5.5 and about 9.5. In a ready-to-use composition, the pH is preferably between about 4.5 and about 9.5, more preferably between about 5 and about 8.5, most preferably between about 5 and about 7.

Preferably the low foam cleaning compositions comprise a quaternary ammonium compound, a polycarboxylic acid and/or salt thereof. The low foam cleaning compositions can further comprise a carrier, dye, an odorant, a pH modifier, a sheeting agent, a solidification aid, a surfactant, or a combination thereof. The low foam cleaning compositions can be suitable for use as warewash detergents, rinse aids, sanitizing detergents, sanitizing rinse aids, hard surface cleaners, laundry detergents, and laundry sanitizers.

Quaternary Ammonium Compound

The low foam cleaning compositions described herein comprise a quaternary ammonium compound. The term "quaternary ammonium compound" generally refers to any composition with the following formula:

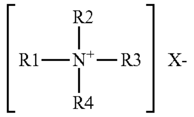

wherein R1-R4 each have less than a C16 chain length and X— is an anionic counterion. In an embodiment the alkyl groups may be alike or different, substituted or unsubstituted, saturated or unsaturated, branched or unbranched, and cyclic or acyclic and may contain ether, ester, or amide linkages; they may be aromatic or substituted aromatic groups. The term "anionic counterion" includes any ion that can form a salt with quaternary ammonium. Examples of suitable counterions include halides such as chlorides and bromides, methyl sulfates, carbonates, and bicarbonates. Preferably, the anionic counterion is chloride. In some embodiments quaternary ammoniums have carbon chains between about 8 and 6, preferably between 8 and 12, or more preferably between 8 and 10 are included in compositions.

Preferred quaternary ammonium compounds are those that are water soluble compounds and can further include salts of the compounds described herein. Suitable salts include, but are not limited to, salts of both inorganic and organic acids, such as nitrate, sulfate, chloride, bromide, iodide, methyl sulfate, methyl sulfonate, carbonate, bicarbonate, carboxylates, polycarboxylates, phosphates, phosphonates, and the like.

Preferred quaternary ammonium compounds include, but are not limited to, alkyl (C8-C16) dimethyl benzyl ammonium chloride (ADBAC), alkyl (C8-16) dimethyl ethyl benzyl ammonium chloride (ADEBAC), and dialkyl (C8-C16) dimethyl ammonium chloride (DAAC), including octyl decyl dimethyl ammonium chloride, dioctyl dimethyl ammonium chloride, and didecyl dimethyl ammonium chloride. In a preferred embodiment, the dialkyl dimethyl ammonium chloride (DAAC) is a dialkyl having C10 or less (C8-C10). In a preferred embodiment, the quaternary ammonium compound is a blend of octyl decyl dimethyl, dioctyl dimethyl, and didecyl dimethyl ammonium chloride. A single quaternary ammonium or a combination of more than one quaternary ammonium may be included in the low foaming cleaning compositions.

In some embodiments depending on the nature of the R group, the anion, and the number of quaternary nitrogen atoms present, the antimicrobial quaternary ammonium compounds may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category is discussed further below.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercially available under the tradenames Rhodaquat M242C/29 and Dehyquart A; alkyltrimethyl ammonium chloride, commercially available as Arquad 16; alkylaryltrimethyl ammonium chloride; and cetyldimethyl ethylammonium bromide, commercially available as Ammonyx DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Monoalkyldimethylbenzyl ammonium salts are generally compatible with nonionic surfactants, detergent builders, perfumes, and other ingredients. Some non-limiting examples of monoalkyldimethylbenzyl ammonium salts include alkyldimethylbenzyl ammonium chlorides, commercially available as Barquat from Lonza Inc.; and benzethonium chloride, commercially available as Lonzagard, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC 2125M from Stepan Company, and Barquat 4250 from Lonza Inc.

Dialkyldimethyl ammonium salts contain two R groups that are long-chain alkyl groups, and the remaining R groups are short-chain alkyl groups, such as methyl groups.

Some non-limiting examples of dialkyldimethyl ammonium salts include didecyldimethyl ammonium halides, commercially available as Bardac 22 from Lonza Inc.; didecyl dimethyl ammonium chloride commercially available as Bardac 2250 from Lonza Inc.; dioctyl dimethyl ammonium chloride, commercially available as Bardac LF and Bardac LF-80 from Lonza Inc.); and octyl decyl dimethyl ammonium chloride sold as a mixture with didecyl and dioctyl dimethyl ammonium chlorides, commercially available as Bardac 2050 and 2080 from Lonza Inc.

In a preferred embodiment, the low foam cleaning compositions comprise from about 10 ppm to about 40 wt. % of a quaternary ammonium compound, more preferably from about 15 ppm to about 30 wt. % of a quaternary ammonium compound, or most preferably from about 20 ppm to about 25 wt. % of a quaternary ammonium compound.

In a preferred embodiment, the concentrated low foam cleaning compositions comprise from about 1 wt. % to about 40 wt. % of a quaternary ammonium compound, more preferably from about 5 wt. % to about 35 wt. % of a quaternary ammonium compound, or most preferably from about 10 wt. % to about 25 wt. % of a quaternary ammonium compound.

In a preferred embodiment, the low foam cleaning compositions comprise from about 10 ppm to about 1000 ppm of a quaternary ammonium compound, more preferably from about 15 ppm to about 500 ppm of a quaternary ammonium compound, or most preferably from about 20 ppm to about 250 ppm of a quaternary ammonium compound.

Polycarboxylic Acid and or Salt

The low foam cleaning compositions preferably comprise a polycarboxylic acid and/or its salt. While not wishing to be bound by the theory, it is believed that the polycarboxylic acid and/or its salt partially neutralize (i.e., mask) the charge of the quaternary ammonium compound by providing a counter ion and that this charge masking reduces, more preferably prevents, the formation and/or stability of foam. It has been found that the electronegativy of the polycarboxylic acid and/or salt is important for the charge masking to occur. In this respect, selecting a polycarboxylic acid and/or salt thereof of with appropriate pKa value(s) is important.

The polycarboxylic acids have at least two pKa values, in a most preferred embodiment, the polycarboxylic acid has three pKa values. Preferably, each of the pKa values is less than about 7, more preferably less that about 6.5. In a preferred embodiment, the polycarboxylic acid has at least two pKa values of less than about 7, more preferably less than about 6.5, and most preferably less than about 6. In a preferred embodiment, the polycarboxylic acid has at least one pKa value of less than about 6, more preferably less than about 5.5, most preferably less than about 5. In a preferred embodiment, each of the pKa values is between about 2 and about 7, more preferably between about 2.5 and about 6.5. In a preferred embodiment, at least two of the pKa values are between about 2 and about 7, more preferably between about 2.5 and about 6.5, most preferably between about 3 and about 6. In a preferred embodiment, the polycarboxylic acid has at least one pKa value between about 2 and about 6, more preferably between about 2.5 and about 5.5, most preferably between about 3 and about 5.

In a preferred embodiment, the polycarboxylic acid is citric acid, succinic, malic acid, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), N,N-Dicarboxymethyl glutamic acid tetrasodium salt (GLDA), methylglycin diacetic acid (MGDA), a salt of any of the foregoing, sodium xylene sulfonate, or a mixture thereof.

In a preferred embodiment, the low foam cleaning compositions comprise from about 25 ppm to about 50 wt. % of a polycarboxylic acid or salt thereof, more preferably from about 50 ppm to about 40 wt. % of a polycarboxylic acid or salt thereof, or most preferably from about 100 ppm to about 35 wt. % of a polycarboxylic acid or salt thereof.

In a preferred embodiment, the concentrated low foam cleaning compositions comprise from about 1 wt. % to about 50 wt. % of a polycarboxylic acid or salt thereof, more preferably from about 5 wt. % to about 40 wt. % of a polycarboxylic acid or salt thereof, or most preferably from about 10 wt. % to about 35 wt. % of a polycarboxylic acid or salt thereof.

In a preferred embodiment, the low foam cleaning compositions comprise from about 25 ppm to about 10,000 ppm of a polycarboxylic acid or salt thereof, more preferably from about 50 ppm to about 5000 ppm of a polycarboxylic acid or salt thereof, or most preferably from about 100 ppm to about 2500 ppm of a polycarboxylic acid or salt thereof.

Carrier

The low foaming cleaning compositions can comprise a carrier. Preferred carriers include water and/or water miscible solvent. The term "water miscible" as used herein, means that the component (e.g., carrier or solvent) is soluble or dispersible in water at about 20° C. at a concentration greater than about 0.2 g/L, preferably at about 1 g/L or greater, more preferably at 10 g/L or greater, and most preferably at about 50 g/L or greater.

In a concentrated liquid composition, the carrier is preferably in a concentration of between about 5 wt. % and about 50 wt. %, more preferably between about 10 wt. % and about 40 wt. %, most preferably between about 15 wt. % and about 35 wt. %.

In a ready-to-use solution, the carrier can be present in an amount appropriate to arrive at the desired concentration of active ingredients. In a preferred embodiment, the amount of carrier in a ready-to-use solution is between about 20 wt. % and about 95 wt. %, more preferably 30 wt. % and about 92 wt. %, most preferably between about 40 wt. % and about 90 wt. %.

Dye Odorant

The low foam cleaning compositions can optionally comprise dyes, odorants including perfumes, and other aesthetic enhancing agents. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Preferred odorants, including fragrances or perfumes, include, but are not limited to, terpenoids such as citronellol, aldehydes such as amyl cinnamaldehyde, a jasmine such as C1S-jasmine or jasmal, vanillin, and the like.

If the low foam cleaning compositions include a dye and/or odorant, such can be added in any amount to achieve the desired aesthetic enhancement. Preferably, a dye or odorant will be in an amount between about 0.001 wt. % and about 5 wt. %.

pH Modifier

The low foam cleaning compositions can optionally comprise a pH modifier. The pH modifier is used to adjust the pH of the low foam cleaning compositions. Suitable pH modifiers can be acids and bases, including, but not limited to, strong acids, weak acids, strong bases, and weak bases. Suitable acids can include organic and inorganic acids. Examples of preferred organic acids include carboxylic acids such as but not limited to hydroxyacetic (glycolic) acid, citric acid, formic acid, acetic acid, propionic acid, butyric acid, valeric acid, caproic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others are also useful in accordance with the invention.

Preferred inorganic acids include, but are not limited to, sulfuric acid, sulfamic acid, methylsulfamic acid, hydrochloric acid, hydrobromic acid, and nitric acid among others. These acids may also be used in combination with other inorganic acids or with those organic acids mentioned above.

Preferred bases include, but are not limited to, ammonia, ammonium hydroxide, amines, alkanolamines, amino alcohols, borates, carbonates, hydroxides, silicates, or a mixture thereof.

If the low foam cleaning compositions include a pH modifier, such can be added in any amount to achieve the desired pH. Preferably, a pH modifier will be in an amount between about 0.001 wt. % and about 10 wt. %.

Sheeting Agent

The low foam cleaning compositions can optionally include a sheeting agent. A sheeting agent is preferably present in embodiments where the low foam cleaning composition is a rinse aid or sanitizing rinse aid. Sheeting agents can optionally be included in other low foaming cleaning compositions as well.

Preferred sheeting agents comprise alcohol ethoxylate compounds that include an alkyl group that has 12 or fewer carbon atoms have the structure represented by Formula I: $R—O—(CH_2CH_2O)_n—H$ (I) wherein R is a (C1-C12) alkyl group and n is an integer in the range of 1 to 100. In some embodiments, R may be a (C5-C12) alkyl group, or may be a (C5-C10) alkyl group. Similarly, in some embodiments, n is an integer in the range of 10-50, or in the range of 15-30, or in the range of 20-25. In some embodiments, alcohol ethoxylate has a low EO content, such as n of 6 or less.

In a more preferred embodiment, the sheeting agent can comprise at least two different alcohol ethoxylate compounds each having structure represented by Formula I. That is, the R and/or n variables of Formula I, or both, may be different in the two or more different alcohol ethoxylate compounds present in the sheeting agent. For example, the sheeting agent can include a first alcohol ethoxylate compound in which R is a ($C_8$-$C_{10}$) alkyl group, and a second alcohol ethoxylate compound in which R is a ($C_{10}$-$C_{12}$) alkyl group. In a preferred embodiment, the sheeting agent does not include any alcohol ethoxylate compounds that include an alkyl group that has more than 12 carbon atoms. In a preferred embodiment, the sheeting agent includes only alcohol ethoxylate compounds that include an alkyl group that has 12 or fewer carbon atoms.

If the low foam cleaning compositions comprise a sheeting agent, the alcohol ethoxylates used in the sheeting agent can be chosen such that they have certain characteristics, for example, are environmentally friendly, are suitable for use in food service industries, and/or the like. For example, the particular alcohol ethoxylates used in the sheeting agent may meet environmental or food service regulatory requirements, for example, biodegradability requirements.

In a preferred embodiment, the low foam cleaning compositions comprise from about 10 ppm to about 40 wt. % of a sheeting agent, more preferably from about 25 ppm to about 35 wt. % of a sheeting agent, or most preferably from about 50 ppm to about 30 wt. % of a sheeting agent.

In a preferred embodiment, the concentrated low foam cleaning compositions comprise from about 1 wt. % to about 40 wt. % of a sheeting agent, more preferably from about 5 wt. % to about 35 wt. % of a sheeting agent, or most preferably from about 10 wt. % to about 30 wt. % of a sheeting agent.

In a preferred embodiment, the low foam cleaning compositions comprise from about 10 ppm to about 10,000 ppm of a sheeting agent, more preferably from about 25 ppm to about 7500 ppm of a sheeting agent, or most preferably from about 50 ppm to about 5000 ppm of a sheeting agent.

Solidification Aid

In a preferred embodiment, the low foam cleaning compositions can optionally comprise one or more solidification aids. Examples of solidification aids include, but are not limited to, urea, an amide such stearic monoethanolamide or lauric diethanolamide or an alkylamide, sulfate salts or sulfated surfactants, and aromatic sulfonates, a solid polyethylene glycol, a solid EO/PO block copolymer, a starch that has been made water-soluble through an acid or alkaline treatment process, various inorganics that impart solidifying properties to a heated composition upon cooling, and the like. Such compounds may also vary the solubility of the low foam cleaning compositions in an aqueous medium during use such that the active ingredients may be dispensed from the solid composition over an extended period of time. In a preferred embodiment, the solidification aid can also serve as a builder.

Suitable aromatic sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butyl naphthalene. Preferred aromatic sulfonates include sodium xylene sulfonate and sodium cumene sulfonate In a preferred embodiment of a solid low foam cleaning composition, the solidification aid comprises sodium chloride, a starch, a sugars, a C1-C10 alkylene glycol such as propylene glycol, a solid PEG, a solid PPG, a solid EP/PO, an amide, urea, an acetate, a borate, a phosphate, a silicate, a sulfonate, or a mixture thereof.

The amount of solidification aid included in a low foam cleaning composition can be dictated by the desired effect. In general, an effective amount of solidification aid is considered an amount that acts with or without other materials to solidify the low foam cleaning composition. Typically, for solid embodiments, the amount of solidification aid in a low foam cleaning composition is between about 10 wt. % and about 80 wt. %, preferably between about 20 wt. % and about 75 wt. %, more preferably between about 20 wt. % and about 70 wt. %.

In a preferred embodiment, the solidification aid is substantially free of sulfate. For example, the cleaning composition may have less than 1 wt. % sulfate, preferably less than 0.5 wt. %, more preferably less than 0.1 wt. %. In a preferred embodiment the cleaning composition is free of sulfate.

Surfactant

In some embodiments, the low foam cleaning compositions can optionally comprise a surfactant. Depending on the desired role of the surfactant and the end-use of the low foam cleaning compositions, suitable surfactants can be nonionic surfactants, anionic surfactants, cationic surfactants, amphoteric surfactants, zwitterionic surfactants, or a mixture thereof. If a surfactant is included in the low foam cleaning compositions In some embodiments, it is preferably in a concentration of from about 10 ppm to about 50 wt. % of a surfactant, more preferably from about 25 ppm to about 45 wt. % of a surfactant, or most preferably from about 50 ppm to about 35 wt. % of a surfactant.

In a preferred embodiment, the concentrated low foam cleaning compositions comprise from about 1 wt. % to about 50 wt. % of a surfactant, more preferably from about 5 wt. % to about 45 wt. % of a surfactant, or most preferably from about 10 wt. % to about 35 wt. % of a surfactant.

In a preferred embodiment, the low foam cleaning compositions comprise from about 10 ppm to about 10,000 ppm of a surfactant, more preferably from about 25 ppm to about 7500 ppm of a surfactant, or most preferably from about 50 ppm to about 5000 ppm of a surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade name Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances.

Examples of nonionic low foaming surfactants include: Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

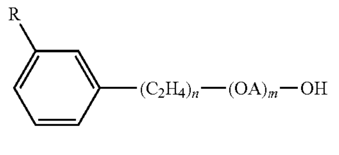

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n$ $(C2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n$ $(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n$ $(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, C1-C4 hydrocarbyl, 2-hydroxy ethyl, 2-hydroxy propyl, ethoxy, propoxy group, or a mixture thereof; R2 is a C5-C31 hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the C6-Cis ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R_{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_V—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

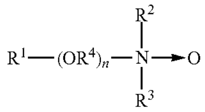

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

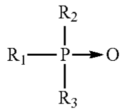

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

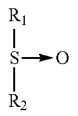

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

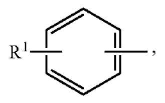

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

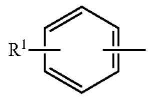

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

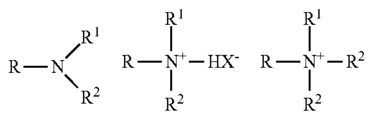

in which, R represents an alkyl chain, R', R'', and R''' may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

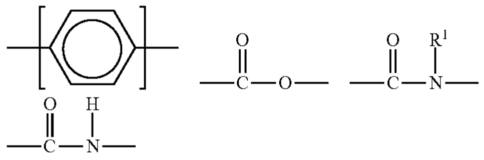

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

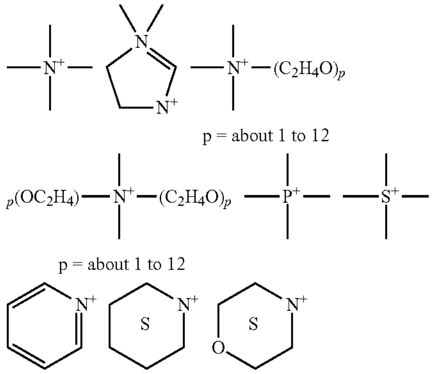

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

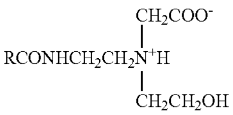

(MONO)ACETATE
Neutral pH Zwitternion

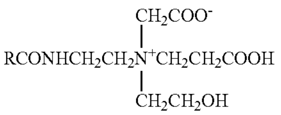

(DI)PROPIONATE

-continued

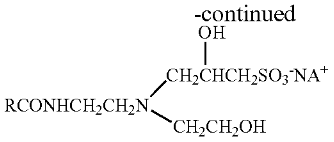

AMPHOTERIC SULFONATE wherein R is an acyclic hydrophobic group containing from about 8 to 18 car on atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

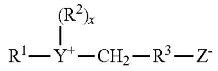

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R_2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

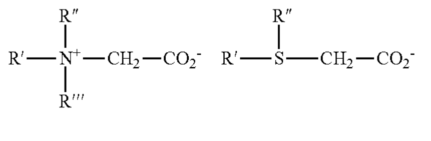

-continued

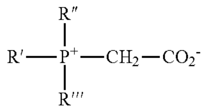

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Preferred Embodiments

Preferred concentrations of the ingredients (and optional ingredients) of the low foam cleaning compositions are shown in Tables 1A-1C (all upper and lower concentration values are modified by the term about as defined herein).

TABLE 1A

| Low Foam Cleaning Compositions | | | |
|---|---|---|---|
| Ingredient | Preferred Concentration | More Preferred Concentration | Most Preferred Concentration |
| Quaternary Ammonium Compound | 10 ppm-40 wt. % | 15 ppm-30 wt. % | 20 ppm-25 wt. % |
| Polycarboxylic Acid and/or Salt | 25 ppm-50 wt. % | 50 ppm-40 wt. % | 100 ppm-35 wt. % |
| Optional Ingredients | | | |
| Carrier | 5 wt. %-95 wt. % | 10 wt. %-92 wt. % | 15 wt. %-90 wt. % |
| Dye/Odorant | 0.001 wt. %-5 wt. % | 0.001 wt. %-5 wt. % | 0.001 wt. %-5 wt. % |
| pH Modifier | 0.001 wt. %-10 wt. % | 0.001 wt. %-10 wt. % | 0.001 wt. %-10 wt. % |
| Sheeting Agent | 10 ppm-40 wt. % | 25 ppm-35 wt. % | 50 ppm-30 wt. % |
| Solidification Aid | 10 wt. %-80 wt. % | 20 wt. %-75 wt. % | 20 wt. %-70 wt. % |
| Surfactant | 10 ppm-50 wt. % | 25 ppm-45 wt. % | 50 ppm-35 wt. % |

TABLE 1B

| Concentrated Low Foam Cleaning Compositions | | | |
|---|---|---|---|
| Ingredient | Preferred Concentration | More Preferred Concentration | Most Preferred Concentration |
| Quaternary Ammonium Compound | 1 wt. %-40 wt. % | 5 wt. %-35 wt. % | 10 wt. %-25 wt. % |
| Polycarboxylic Acid and/or Salt | 1 wt. %-50 wt. % | 5 wt. %-40 wt. % | 10 wt. %-35 wt. % |
| Optional Ingredients | | | |
| Carrier | 5 wt. %-50 wt. % | 10 wt. %-40 wt. % | 15 wt. %-35 wt. % |
| Dye/Odorant | 0.001 wt. %-5 wt. % | 0.001 wt. %-5 wt. % | 0.001 wt. %-5 wt. % |
| pH Modifier | 0.001 wt. %-10 wt. % | 0.001 wt. %-10 wt. % | 0.001 wt. %-10 wt. % |
| Sheeting Agent | 1 wt. %-40 wt. % | 5 wt. %-35 wt. % | 10 wt. %-30 wt. % |
| Solidification Aid | 10 wt. %-80 wt. % | 20 wt. %-75 wt. % | 20 wt. %-70 wt. % |
| Surfactant | 1 wt. %-50 wt. % | 5 wt. %-45 wt. % | 10 wt. %-35 wt. % |

TABLE 1C

| Ready-to-Use Low Foam Cleaning Compositions | | | |
|---|---|---|---|
| Ingredient | Preferred Concentration | More Preferred Concentration | Most Preferred Concentration |
| Quaternary Ammonium Compound | 10 ppm-1000 ppm | 15 ppm-500 ppm | 20 ppm-250 ppm |
| Polycarboxylic Acid and/or Salt | 25 ppm-10,000 ppm | 50 ppm-5000 ppm | 100 ppm-2500 ppm |
| Optional Ingredients | | | |
| Carrier | 20 wt. %-95 wt. % | 30 wt. %-92 wt. % | 40 wt. %-90 wt. % |
| Dye/Odorant | 0.001 wt. %-5 wt. % | 0.001 wt. %-5 wt. % | 0.001 wt. %-5 wt. % |
| pH Modifier | 0.001 wt. %-10 wt. % | 0.001 wt. %-10 wt. % | 0.001 wt. %-10 wt. % |
| Sheeting Agent | 10 ppm-10,000 ppm | 25 ppm-7500 ppm | 50 ppm-5000 ppm |
| Surfactant | 10 ppm-10,000 ppm | 25 ppm-7500 ppm | 50 ppm-5000 ppm |

As discussed above, the low foaming cleaning compositions can be formulated as concentrated (liquid or solid) compositions and subsequently diluted to form use compositions, or they can be formulated as ready-to-use compositions. In general, a concentrate refers to a composition that is intended to be diluted with water to provide a use solution that contacts an object to provide the desired cleaning, rinsing, or the like. The low foam cleaning composition that contacts the articles to be washed can be referred to as a concentrate or a use composition (or use solution or ready-to-use composition) dependent upon the formulation employed in methods according to the invention. It should be understood that the concentration of the quaternary ammonium compound and polycarboxylic acid and/or salt thereof as well as the other optional ingredients in the low foam cleaning composition will vary depending on whether the composition is provided as a concentrate or as a use solution.

A use solution may be prepared from the concentrate by diluting the concentrate with water at a dilution ratio that provides a use solution having desired concentration. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

Preferably, the low foam cleaning compositions are low foaming or non-foaming. As used herein, non-foaming means that the composition forms no foam upon dilution, or that it forms foam which breaks in less than 10 seconds, more preferably less than 5 seconds at a temperature between about 20° C. and about 100° C. As used herein, low foaming means that the composition forms foam which breaks in less than 30 seconds, more preferably less than 20 seconds, most preferably less than 15 seconds at a temperature between about 20° C. and about 100° C.

Methods of Manufacturing the Low Foam Cleaning Compositions

The low foam cleaning compositions can be prepared as solid or liquid compositions. Suitable solid cleaning compositions, include, but are not limited to granular and pelletized solid compositions, powders, solid block compositions, cast solid block compositions, extruded solid block composition, pressed solid compositions, and others.

Solid particulate cleaning compositions can be made by merely blending the dry solid ingredients formed according to the invention in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Other suitable packaging for the composition includes flexible bags, packets, shrink wrap, and water soluble film such as polyvinyl alcohol.

The solid low foam cleaning compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid cleaning composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 3000 psi, about 5 to about 2500 psi, or about 10 psi to about 2000 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of an optional curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F. and particularly up to approximately 120° F.

The resulting solid low foam cleaning composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration. All publications and patent applications in this specification are indicative of the level of ordinary skill in the art to which this invention pertains.

Methods of Using the Low Foam Cleaning Compositions

The low foam cleaning compositions can be used in a variety of ways. It is expected that the low foam cleaning compositions are applied to an article to be cleaned by contacting the article. This contacting can be performed by pouring, spraying, mopping, wiping, or any other way of applying the composition. In a preferred embodiment, the article can be rinsed with water after application of the low foam cleaning composition. In a preferred embodiment, the article can be rinsed prior to application of the low foam cleaning composition.

The low foam cleaning compositions can be applied in a cleaning process with temperatures ranging from about 20° C. to about 100° C. In a preferred embodiment, the low foam cleaning composition is applied in a low temperature cleaning process with temperatures between about 20° C. and about 70° C., more preferably between about 20° C. and about 60° C., most preferably between about 20° C. and about 50° C.

The methods of use can include, but are not limited to, warewash methods, laundering methods, clean-in-place methods, hard surface cleaning methods, and sanitizing methods. The low foam cleaning compositions can be applied in any of these methods as a pre-treatment, a washing step, a rinsing step, and/or a finishing step.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims. The materials used in the following Examples are listed below.

The following commercially available polycarboxylic acids and their salts were employed in the examples: citrate, succinate, malate, ethylenediaminetetraacetic acid (EDTA), N,N-Dicarboxymethyl glutamic acid tetrasodium salt (GLDA), and methylglycin diacetic acid (MGDA).

The following commercially available quaternary ammonium compounds were employed in the examples: alkyl alkoxylated quaternary ammonium, alkyl diethanol quaternary ammonium, alkyl C10-C16 benzyl ammonium chloride (ADBAC), alkyl C10-C16 ethylbenzyl ammonium chloride (ADEBAC), and dialkyl C8-C16 dialkyl C1-C4 ammonium salt. Quaternary ammonium compounds offered under the following tradenames were also employed in the examples: Bardac 205M, Bardac 2250, Carboquat, Stepan Quat, and BarQuat MB-50.

The following exemplary commercially available defoamers were employed in the examples: Airase® (a siloxane defoamer available from Evonik), Plurafac SLF-180 (an alcohol alkoxylate available from multiple commercial vendors), N3 (an exemplary commercially available reverse block copolymer defoaming surfactant), and Surfynol® MD 20 (a Gemini-based defoaming surfactant commercially available from Evonik).

Example 1

Foam Evaluation

The foaming properties of the quaternary ammonium compounds were evaluated and then tested for reduced foaming when traditional defoaming compounds were included. The foam height was determined with the following procedural steps:

1. A 1200 ppm solution of the test composition was mixed in water.
2. The foam height was measured immediately after mixing.
3. The solution was agitated and the foam height was measured after 15 seconds.
4. The solution was agitated and the solution was measured after another 45 seconds of agitation (60 seconds total since the solution was mixed).

Figure 1B:
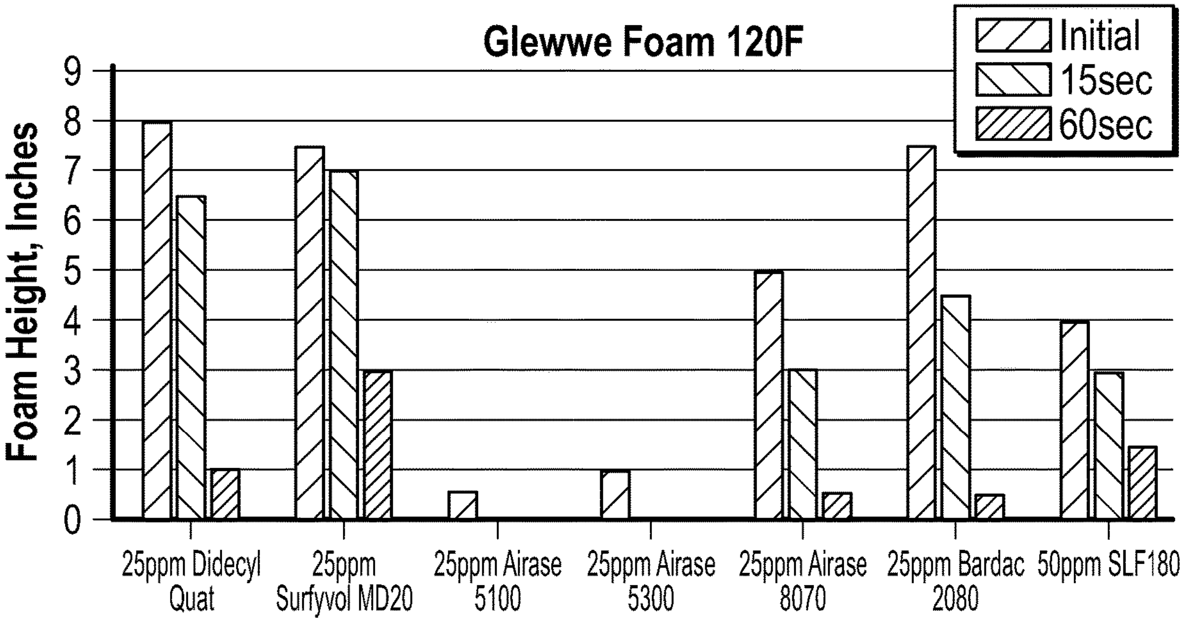

The temperature of the solution was at 120° F. for the duration of the test. The results of these preliminary tests are provided in FIGS. 1A and 1B. As can been seen in FIGS. 1A and 1B, the various quaternary ammonium compounds tested provided significant foam height after mixing at after 15 seconds of agitation. The traditional defoamers had varying impacts on the foaming properties of the quaternary ammonium compounds.

Figure 2A:
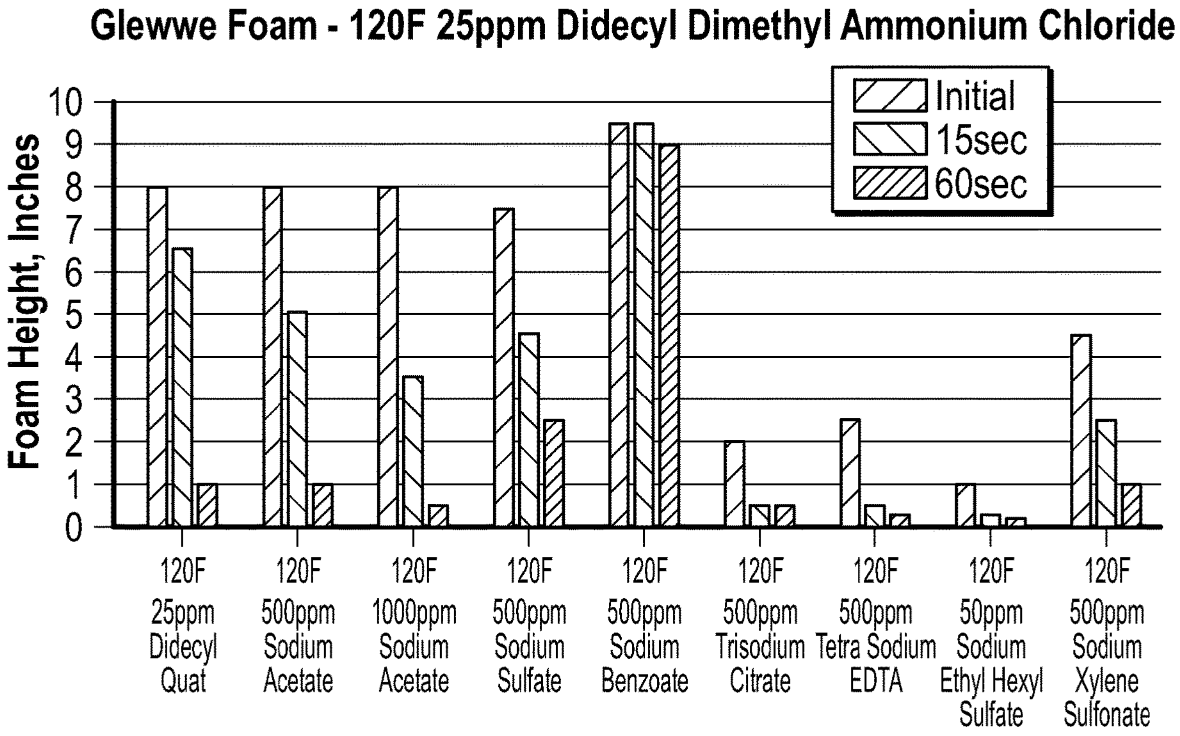
FIGS. 2A and 2B show bar graphs comparing the foam properties of various quaternary ammonium compounds on their own and in the presence of polycarboxylic acids and/or salts immediately upon mixing in solution, about 15 seconds after mixing, and about 1 minute after mixing. The foam height measurements are shown in inches.
Figure 2B:
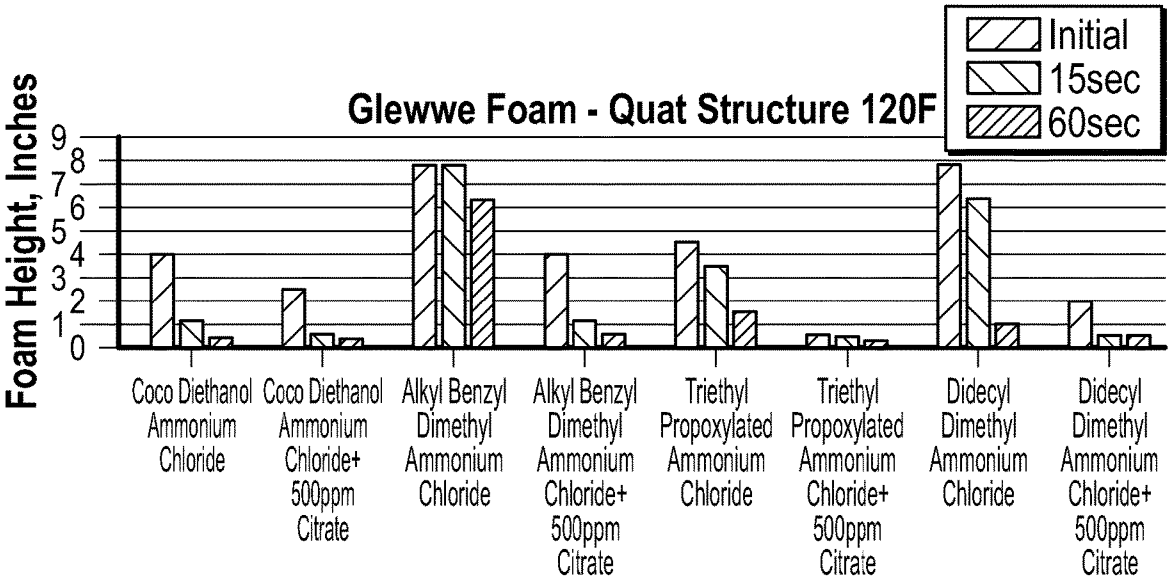

The ability of the polycarboxylic acids and/or salts to control the foam of different quaternary ammonium compounds was also tested. The same procedural steps outlined above were followed. The results of this testing are shown in FIGS. 2A and 2B. As can be seen in FIGS. 2A and 2B, the majority of polycarboxylic acids and/or salts provided a significant reduction to the foaming. Those that did not were acetate, sodium sulfate, and sodium benzoate. While not wishing to be bound by the theory it is believed that this is in part due to the monoprotic nature of acetate and sodium benzoate and the strong acid pKa of sodium sulfate (pKa of −3). The other polycarboxylic acids provided similar, and often superior, foam reduction in contrast to traditional defoamers shown in FIGS. 1A and 1B.

Example 2

Antimicrobial Evaluation

The quaternary ammonium compounds were tested for antimicrobial efficacy against exemplary bacteria (*E. coli* and *S. aureus*) under different pH conditions. For this evaluation, various test solutions were prepared in 500 ppm hard water at a temperature of 120° F. The microbial population was contacted with the test composition for about 30 seconds. The microbial population was measured before and after the contacting step and the difference was taken to identify the log reduction. The quaternary ammonium compounds tested, their concentrations, and the corresponding log reductions are shown below in Table 2.

TABLE 2

| | *E. coli* (ATCC 11229) | *S. aureus* (ATCC 6538) |
|---|---|---|
| pH 9 | | |
| 50 ppm Bardac 205M | 3.39 | 6.80 |
| 40 ppm Bardac 205M | 4.63 | Did not test |
| 30 ppm Bardac 205M | 3.33 | Did not test |

TABLE 2-continued

| | *E. coli* (ATCC 11229) | *S. aureus* (ATCC 6538) |
|---|---|---|
| pH 8 | | |
| 40 ppm CarboQuat | 5.70 | 6.69 |
| 30 ppm CarboQuat | 3.2 | 6.69 |
| pH 7 | | |
| 50 ppm Bardac 2250 | 6.71 | Did not test |
| 40 ppm Bardac 2250 | 5.02 | Did not test |
| 30 ppm Bardac 2250 | 3.33 | Did not test |
| pH 5 | | |
| 30 ppm Stepan Quat | 4.93 | 6.69 |
| 30 ppm CarboQuat | 6.68 | 6.69 |
| 30 ppm BarQuat MB-50 | 4.41 | 6.88 |
| 30 ppm Bardac 205M | 6.83 | 6.88 |
| 30 ppm CarboQuat | 6.83 | 6.88 |
| 20 ppm CarboQuat | 5.08 | 6.88 |

This testing was performed to assess the appropriate pH conditions that would maintain the antimicrobial efficacy of the quaternary ammonium compounds so that the polycarboxylic acids and/or their salts could be effectively employed in the compositions. As can be seen in Table 2, the compositions provided significant log reduction at pHs between about 5 and 9. For example, at pH values of about 5, 8, and 9, solutions of the tested quaternary ammonium compositions provided log reductions of greater than about 6 after 30 seconds contact time to microbial populations of *S. aureus.*

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A cleaning composition comprising:

from about 5 wt-% to about 40 wt. % of a quaternary ammonium compound;

a polycarboxylic acid, sodium xylene sulfonate, and/or salt or mixture thereof with a concentration of about 5 wt-% and about 50 wt-%; wherein the polycarboxylic acid has at least two pKa values between about 2 and about 6; and wherein the composition is a concentrate and upon dissolving provides a log reduction of at least about 6 after a contact time of 30 seconds of contact time to *S. aureus*; and wherein the composition has a pH range of 5 to 9;

wherein the composition is a solid and comprises one or more solidification aids present in a concentration of between 10 wt. % and about 80 wt. %; wherein the solidification aid comprises sodium chloride, a starch, a sugar, a C1-C10 alkylene glycol, a solid PEG, a solid PPG, a solid EP/PO, an amide, urea, an acetate, a borate, a phosphate, a silicate, a sulfonate, or a mixture thereof; and wherein the solidification aid comprises less than 0.5 wt-% sulfate;

wherein the composition is free of alkyl polyglycoside.

2. The cleaning composition of claim 1, wherein the polycarboxylic acid comprises one or more of citric acid, succinic, malic acid, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), N,N-dicarboxymethyl glutamic acid tetrasodium salt (GLDA), methylglycinediacetic acid (MGDA), a salt of any of the foregoing, or a mixture thereof.

3. The cleaning composition of claim 1, wherein the quaternary ammonium compound has an alkyl group of C8-C16 chain length dimethyl benzyl ammonium chloride (ADBAC), has an alkyl group of C8-C16 chain length dimethyl ethyl benzyl ammonium chloride (ADEBAC), dialkyl group of C8-C16 chain length dimethyl ammonium chloride (DAAC), or a mixture thereof.

4. The cleaning composition of claim 1, wherein the composition provides a pH of between about 4.5 and about 10 upon dilution.

5. The cleaning composition of claim 1, the quaternary ammonium compound is in a concentration of between about 10 wt. % and about 40 wt. %; and the polycarboxylic acid or salt thereof is in a concentration of between about 10 wt. % and about 50 wt. %.

6. The cleaning composition of claim 1, wherein the composition is diluted to a ready-to-use liquid composition; wherein the quaternary ammonium compound is in a concentration of between about 10 ppm and about 1000 ppm; and the polycarboxylic acid or salt thereof is in a concentration of between about 25 ppm and about 10,000 ppm.

7. The cleaning composition of claim 1, wherein the composition further comprises an amphoteric surfactant.

8. The cleaning composition of claim 1, wherein the composition further comprises a dye, an odorant, a pH modifier, a sheeting agent, a surfactant, or a mixture thereof.

9. A method of cleaning an article comprising:

contacting the article with the cleaning composition of claim 1; and dissolving the cleaning composition before or during the contacting step;

wherein the composition provides a log reduction of greater than 6 after a contact time of 30 seconds of contact time to microbial populations.

10. The method of claim 9, wherein the dissolving provides a dilution ratio of between about 1:100 and about 1:5,000 of the solid cleaning composition to water.

11. The method of claim 9, wherein the article is a ware, a textile, or a hard surface.

12. The method of claim 9, wherein the method further comprising, the step of rinsing the article.

13. The method of claim 9, wherein the method is performed at a temperature between about 20° C. and about 100° C.

14. The method of claim 9, wherein the method is performed at a temperature between about 20° C. to about 70° C., and wherein the cleaning method is a sanitizing method.

15. The method of claim 9, wherein during the method any foam that forms breaks in less than 30 seconds.

* * * * *